Oct. 25, 1938.　　　　H. C. ROTH ET AL　　　　2,134,534
CLUTCH CONTROL MECHANISM
Filed Feb. 6, 1935　　　　3 Sheets-Sheet 1

INVENTOR.
HARRIS C. ROTH
BY WILLIAM J. ANDRES
ATTORNEY

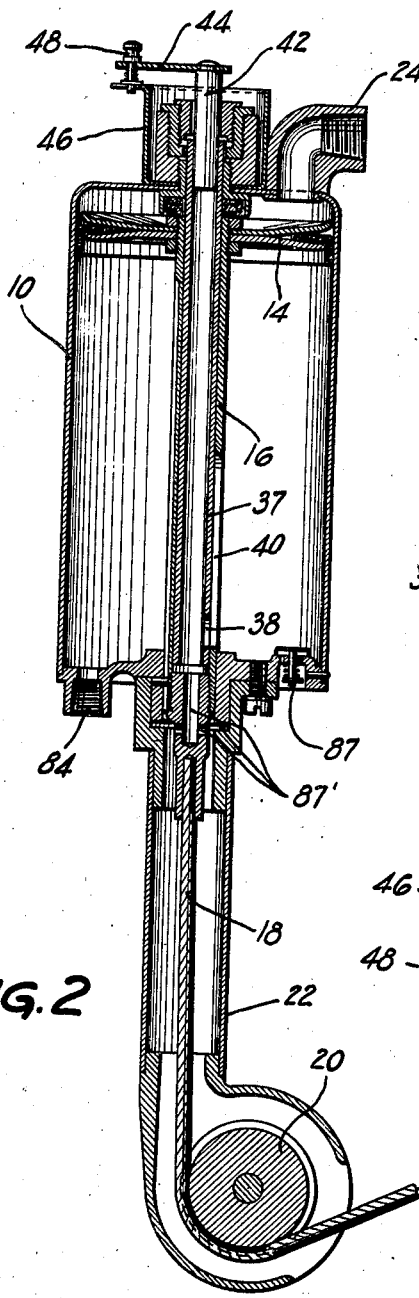
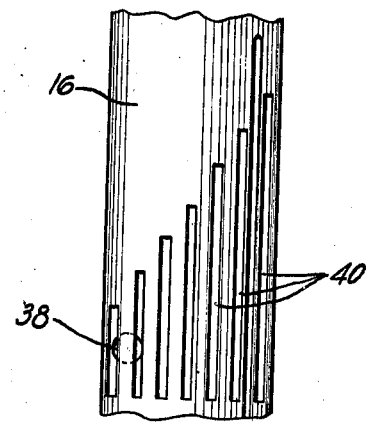
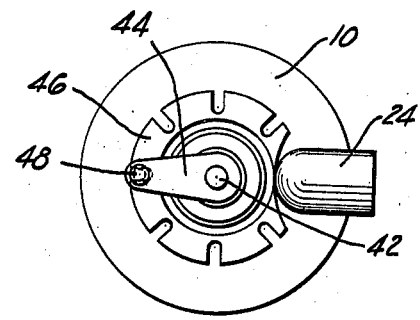
FIG. 2
FIG. 3
FIG. 4
INVENTOR.
HARRIS C. ROTH
BY WILLIAM J. ANDRES
ATTORNEY

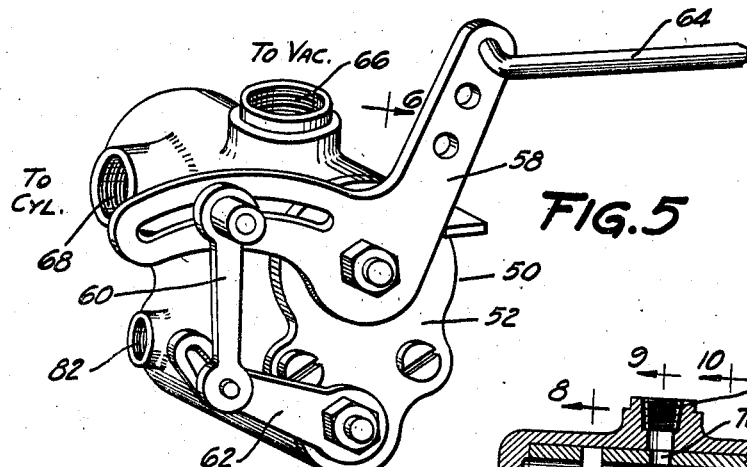
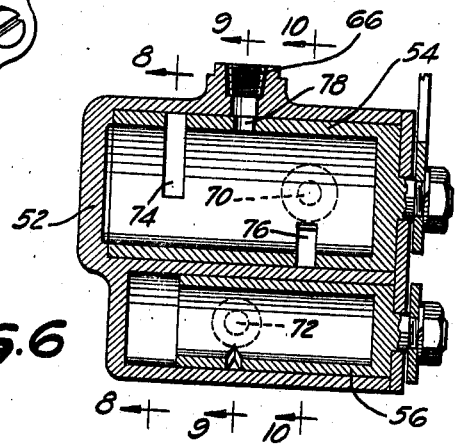
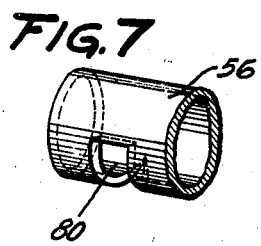
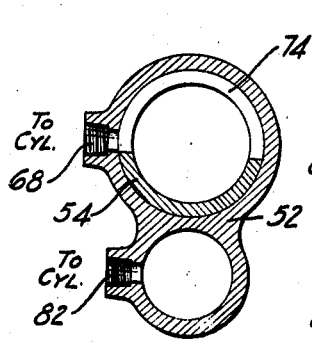
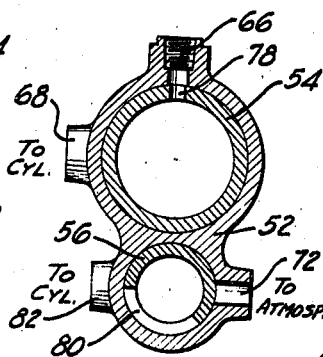
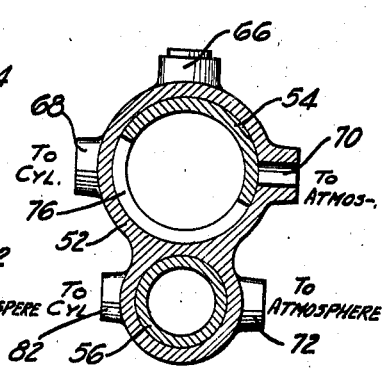

Patented Oct. 25, 1938

2,134,534

UNITED STATES PATENT OFFICE 2,134,534

CLUTCH CONTROL MECHANISM

Harris C. Roth, Detroit, Mich., and William J. Andres, Pittsburgh, Pa., assignors to Bendix Products Corporation, South Bend, Ind., a corporation of Indiana Application February 6, 1935, Serial No. 5,184

7 Claims. (Cl. 192—.01)

This invention relates in general to control mechanism for an automotive vehicle, and more particularly to a vacuum operated power means for automatically operating the clutch of the vehicle with operation of the throttle. The invention is designed as an improvement over the mechanism disclosed in the patent to Belcia, No. 1,470,272.

It is the principal object of the invention to provide mechanism, preferably built into the clutch motor, whereby the clutch engaging operation of the motor may be varied to suit the needs of the particular clutch equipment with which the clutch motor cooperates and to compensate for clutch wear such variation to include both a determination of the total elapsed time necessary to effect an engagement of the clutch and also the mode of operation of the driven clutch plate as it moves toward the driving plate.

More particularly, it is an object of the invention to provide a mechanism whereby the driven clutch plate is controlled in its movement toward the driving clutch plate, the rate of movement being determined by adjustable means which may be varied at will.

It is a further object of the invention to provide a clutch motor construction whereby the driven plate is moved into engagement with the driving plate in two distinct stages of movement, the first stage being determined, both as to distance and elapsed time, by manually adjustable means and the second stage being determined by a so-called bleed valve, which is also manually adjustable, preferably by the position of the accelerator pedal.

A further object of the invention is to provide an effective three-way control valve for determining the gaseous pressure of one end of a double-ended clutch motor, said valve to be combined as a unit with the aforementioned clutch engaging bleed valve structure, the latter determining the gaseous pressure of the remaining end of the motor.

Other objects of the invention and desirable details of construction and combinations of parts will become apparent from an inspection of the following specification taken in conjunction with the accompanying drawings, in which:

Figure 2 is a sectional view of the clutch motor disclosed in Figure 1;

Figure 3 is an enlarged and fragmentary view of the piston rod of the clutch motor of Figure 2, disclosing a portion of the structure for effecting an adjustment of the clutch engaging operation;

Figure 4 is an end view of the clutch motor of Figure 2, disclosing the index plate mechanism in detail;

Figure 1:
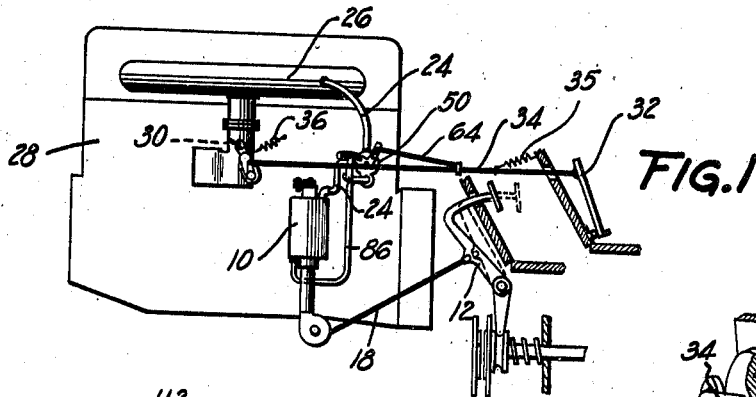
Figure 1 is a diagrammatic view of the clutch operating mechanism constituting the present invention.
Figure 14:
Figure 12:
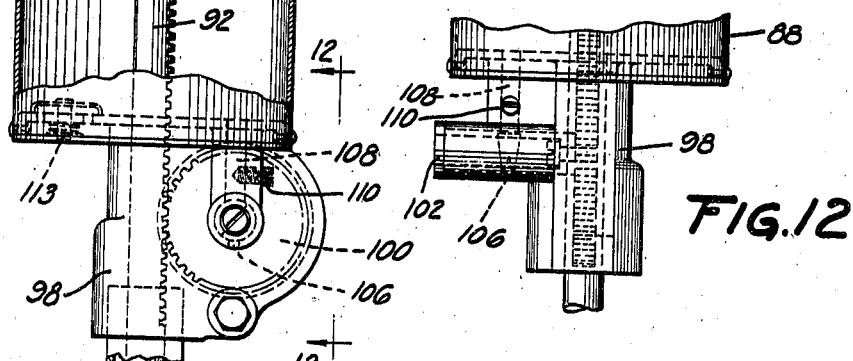
Figure 11:
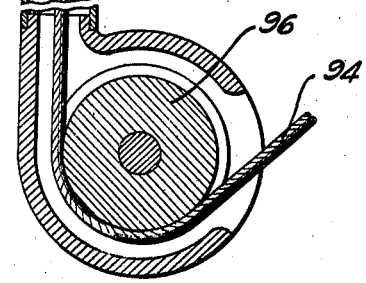
Figure 13:
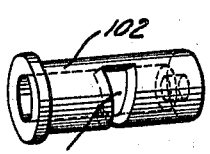

Figure 5 discloses, in prospective, the combined control and bleed valve unit of the mechanism of Figure 1;

Figure 6 is a sectional view of the valve structure of Figure 5 taken on line 6—6 thereof, showing the principal operating parts in detail;

Figure 7 is a fragmentary view, disclosing, in detail, the principal element of the bleed valve of Figure 6;

Figures 8, 9 and 10 are sections taken respectively on lines 8—8, 9—9 and 10—10 of Figure 6 and disclosing details of the combined control and bleed valve structure;

Figure 11 discloses, in longitudinal section and in side elevation, a modified form of clutch motor;

Figure 12 is a fragmentary view, looking in the direction of the arrows 12—12 of Figure 11, disclosing in detail the bleed valve mechanism of the motor;

Figure 13 discloses the principal element of the bleed valve of the motor disclosed in Figure 11; and Figure 14 discloses, in detail, the connection between the valve and accelerator linkage of Figure 1 whereby a certain amount of lost motion is provided to insure operation of the clutch motor valve in timed relation to the operation of the throttle.

Referring to Figures 1-10, inclusive, disclosing a preferred embodiment of the invention, there is disclosed in Figure 1 a diagrammatic view of my clutch control mechanism adapted to operate a conventional clutch comprising driving and driven plates 6 and 8 respectively, the driven plate being operatively connected to a conventional clutch pedal 12.

The invention is directed to means for automatically operating a clutch pedal to simulate a conventional manual operation thereof. To this end a vacuum operated clutch motor is provided comprising a cylinder 10 housing a reciprocable piston element 14, the latter being operatively connected to the clutch pedal 12 by means of a two part connecting rod 16 and flexible cable 18. The cable is adapted to be extended about a direction-changing sheave 20 pivotally mounted within a housing 22, forming a lower end extension of the clutch motor. A conduit 24 interconnects the upper end of the clutch motor cylinder with an intake manifold 26 of an internal-combustion engine 28, the latter being provided with the usual fuel control throttle member 30 operated by an accelerator 32 interconnected with the throttle by means of a rod 34. A return spring 35 is provided to return the accelerator to its off or inoperative position and a spring 36 is provided to close the throttle valve 30.

The clutch motor, described in greater detail, comprises a tubular member 37 telescoped within the connecting rod 16, said member being provided with a circular opening 38 adapted to register, as indicated diagrammatically in dotted lines in Figure 3, with one or possibly two of a plurality of slots 40 in the rod 16, said slots being of various lengths and widths, as disclosed in Figure 3. The member 37 is rotatable by means of a pin 42 having a shrink fit within one end of the member 37, the pin being rotated by a crank arm 44, the position of the arm being determined by indexing means comprising a casing 46 secured to one end of the cylinder 18, the casing being notched at its peripheral edge to receive a spring pressed pin member 48 mounted in one end of the arm 44.

The valve means which, together with the slotted rod 16 and tube 37, control the clutch disengaging and engaging operations of the clutch motor comprise a unit indicated generally by the numeral 50, Figure 1. This unit, disclosed in detail in Figures 5 to 10 inclusive, comprises an integral casing 52 bored to receive tubular valve members 54 and 56 rotatable by linkage comprising a bell crank 58, interconnected link 60, and crank 62, all operated by a link 64 connected with the throttle rod 34. The valve unit is provided with ports 66 and 68 connected to the portions of the conduit 24 and with vent ports 70 and 72. The valve member 54 is provided with slots 74 and 76 adapted to register respectively with the port 68 and port 70, and a port 78 in the valve is provided to register with the port 66 in the valve casing. The valve member 56 is provided with a slot 80 adapted to interconnect port 72 and port 82, the latter interconnected with a port 84 in the cylinder 10 by means of a conduit 86.

Describing the operation of the aforementioned mechanism, with the motor idling and the accelerator released the valve member 54, which constitutes a three-way valve, is rotated to cut off the registry of slot 76 with port 70 and interconnect slot 74 with port 68 leading to the clutch motor. At the same time the port 78 in the valve is registered with port 66 of the valve casing to interconnect the valve with the manifold. The upper end compartment of the clutch motor of Figure 2 is thus evacuated, atmosphere entering through a check valve 87 to move the piston 12 upwardly and disengage the clutch. When it is desired to engage the clutch, for example after a gear shifting operation or in starting the vehicle, the accelerator is depressed, thereby rotating the three-way valve member 54 to cut off the connection between the port 78 and port 66 and interconnect slot 76 with the atmospheric port 70. At the same time the slot 74 is in registry with the port 68, thus providing a vent to the clutch motor via port 70, slot 76, slot 74 and port 68 to re-establish atmospheric pressure in the upper compartment of the motor to initiate an engagement of the clutch.

The engaging movement of the clutch is controlled by the motor to simulate a corresponding manual engagement of the clutch wherein the clutch pedal is moved rapidly up to the point of engagement of the clutch plates 8 and 6, and thereafter the movement is relatively slow to permit a smooth engagement of the clutch. With the clutch motor disclosed this is accomplished by means of an efflux of air from the lower compartment of the motor via one or more of the slots 40 in registry with the port 38 in the tubular index member 37. The air then passes through openings 87' in the connecting rod, which communicate with the atmosphere through the open-ended housing 22. The clutch is thus engaged relatively rapidly under the action of the clutch spring until the slots 40 move out of registry with the port 38. The rapid efflux of air from the motor is thus terminated, thus automatically terminating the rapid engaging movement of the clutch, and the parts are so adjusted that this retardation of the engagement is effected just as the clutch plates are about to contact. Thereafter the engagement is completed relatively slowly to effect a smooth clutch engagement by virtue of the passage of air from the clutch motor via the conduit 86 and bleed valve 56. Air is vented from the valve through the slot 80 and port 72, the rate of flow of air depending upon the shape of the area of the slot 80 then in registry with the port 72. It will be obvious that with a small movement of the accelerator pedal the tip end of the slot 80 is registered with port 72, thereby providing a relatively slow engagement of the clutch. As the accelerator is depressed more of the slot 80 is exposed to the port 72, providing a faster engagement of the clutch.

An important feature of the invention lies in the means for adjusting the operation of the clutch motor to determine the elapsed time for effecting the first and rapid stage of clutch engaging movement and/or determining the distance of movement of the clutch pedal and driven clutch plate during this first phase of clutch engaging operation. This is effected by means of the registering of the port 38 with one or more of the slots 40, which vary both as to length and width. Obviously, the indexing member 37 may be rotated by the operating means 44 and 48 to interconnect the port 38 with any one of or any two adjacent slots. With this adjustment, as indicated above, both the elapsed time of first-stage movement of the clutch and the distance of said movement may be controlled by the size and shape of the air conducting orifice, for the flow of air from the clutch motor will determine the rate of movement of the piston 14 and its connected clutch.

Characteristics of the particular clutch may thus be made to agree with the clutch operating mechanism of the invention, for with some clutches a relatively long throw of the clutch pedal is necessary before the clutch plates move into contact. It is, of course, also necessary to cut down the total elapsed time of clutch engagement to a minimum. The aforementioned mechanism also provides a means for adjusting the control mechanism to compensate for clutch plate wear, so that at all times the rapid movement of the clutch terminates just at the point of engagement of the clutch plates.

There is disclosed in Figure 11 a modified form of clutch motor comprising a cylinder 88 provided with a piston 90, the latter connected to the clutch pedal by means of a rack 92 and cable 94. The cable extends about a direction-changing sheave 96 pivotally mounted in one end of a housing 98, secured to the lower end of the cylinder 88. The rack 92 meshes with a pinion 100, operably connected to a valve member 102 slotted at 104 to interconnect an atmospheric vent port 106 and a duct 108 leading to the interior of the cylinder. A needle valve member 110 is adjustably mounted in the housing 98 to provide a restricting means to regulate the flow of air through the duct.

A conduit, not shown, may interconnect a port 112 in the upper end of the cylinder 88 with the intake manifold, and a three-way valve unit of any desirable construction, for example similar to the valve member 54 of Figure 6, may be incorporated in this conduit.

The operation of the aforementioned embodiment is similar to that of the preferred embodiment of Figure 2. With release of the accelerator pedal the three-way valve, not shown, functions to evacuate the upper end of the clutch cylinder 88 to disengage the clutch, a check valve 113 being provided to permit the upward movement of the clutch piston 90. With an operation of the accelerator pedal to open the throttle the three-way valve is operated to vent the upper end of the clutch motor to initiate the engagement of the clutch. The first stage of clutch movement is relatively rapid by virtue of the relatively rapid flow of air from the larger end of the slot 104, Figure 13. As the clutch approaches a position where the plates are about to contact, the valve member 102 has been rotated by means of the rack 92 and pinion 100, so that the lower end of the slot is in registry with the vent port 106. The engagement of the clutch is therefore relatively slow, which is as desired. The flow of air throughout the entire cycle of clutch engagement is thus progressively varied as the piston moves to rotate the valve member 102. The variation of the engagement of the clutch may also be regulated by the setting of the valve member 110.

A further feature of the invention is disclosed in detail in Figure 14, disclosing a lost motion connection between the accelerator operated throttle rod 34 and the valve 30. This connection comprises a stamping 114, fixedly secured to the lower end of a throttle valve operating lever 116 and provided with an integral tab 118 serving as a stop for a lever 120, which is pivotally secured at 122 to the stamping and pivotally connected at its upper end to the throttle rod 34. With this construction, upon releasing the accelerator the spring 36 functions to close the throttle valve to its idling position, the lever 120, however, moving clockwise thereafter a sufficient distance to permit actuation of the three-way control valve to interconnect the clutch motor with the manifold and initiate a disengagement of the clutch. It follows therefore that upon depression of the accelerator the three-way valve is first operated to initiate the engagement of the clutch before the throttle is opened.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In a vacuum operated clutch operating mechanism, a double-ended fluid motor, a piston member within said motor, an operating rod connected to said piston and slidably mounted in one end of said motor, and manually adjustable means, cooperating with said rod, for selectively predetermining both the degree of movement and mode of movement of said piston during a portion of its operative stroke, said means comprising a member telescoped within the operating rod and capable of rotary movement.

2. In a vacuum operated clutch operating mechanism, a double-ended fluid motor, a piston member within said motor, a multi-slotted operating rod connected to said piston and slidably mounted in one end of said motor, and manually adjustable means, cooperating with said rod, for selectively predetermining both the degree of movement and mode of movement of said piston during a portion of its operative stroke, said means comprising a member telescoped within the operating rod and capable of rotary movement, said rotary movement of said rod being effected by index means mounted on one end of said motor and at one end of said telescoped member.

3. A valve unit for controlling a clutch operating fluid motor comprising a casing member, a rotatable three-way valve member housed within said casing, a rotatable bleed valve member also housed within said casing, and linkage associated with said valve casing for effecting simultaneous operation of both of the aforementioned valve members.

4. A valve unit for controlling a clutch operating fluid motor comprising a casing member, a rotatable three-way valve member housed within said casing, a rotatable bleed valve member also housed within said casing, and linkage associated with said valve casing for effecting simultaneous operation of both of the aforementioned valve members, said linkage comprising a crank operably connected to said bleed valve member, a bell crank operably connected to said three-way valve member and a link interconnecting said cranks.

5. In a clutch operating mechanism for an automotive vehicle provided with a throttle and an accelerator, a crank member operably connected to said throttle, said member provided with spaced stops at its ends, linkage interconnecting said crank and accelerator, said linkage comprising an operating link pivotally connected at one of its ends to one end of the aforementioned crank and adapted to abut said stops, and a link interconnecting the other end of said operating link and the accelerator.

6. A clutch operating mechanism for an automotive vehicle provided with an internal-combustion engine and a clutch comprising, in combination, a double-ended fluid motor, a fluid transmitting connection interconnecting one end of said motor with the intake manifold of the internal-combustion engine, a control valve interposed in said connection for controlling the gaseous pressure in one end of the motor, a bleed valve, a fluid transmitting connection interconnecting the remaining end of the motor with said bleed valve, and manually adjustable means for in part controlling the gaseous pressure within said last-mentioned end of the motor during the first stage of clutch engaging operation of the motor, said adjustable means comprising a single means for selectively determining the degree of first-stage movement of the power element of said motor and the elapsed time of said first stage of movement by varying the rate of movement of said power element.

7. In a vacuum operated clutch operating mechanism, a double-ended fluid motor, a piston member within said motor, an operating rod connected to said piston and slidably mounted in one end of said motor, and manually adjustable means cooperating with said rod for controlling the operation of said piston member during the first stage of clutch engaging operation of the motor, said adjustable means comprising a single means for selectively determining the degree of first-stage movement of the piston member and the elapsed time of said first-stage movement by varying the rate of movement of said piston member.

HARRIS C. ROTH.
WILLIAM J. ANDRES.